US010970399B2

(12) United States Patent
Zeh et al.

(10) Patent No.: US 10,970,399 B2
(45) Date of Patent: Apr. 6, 2021

(54) METHOD AND APPARATUS FOR PROCESSING DATA

(71) Applicant: Infineon Technologies AG, Neubiberg (DE)

(72) Inventors: Alexander Zeh, Munich (DE); Viola Rieger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 203 days.

(21) Appl. No.: 16/161,440

(22) Filed: Oct. 16, 2018

(65) Prior Publication Data

US 2019/0114430 A1 Apr. 18, 2019

(30) Foreign Application Priority Data

Oct. 18, 2017 (DE) ...................... 10 2017 124 354.2

(51) Int. Cl.
*G06F 21/00* (2013.01)
*G06F 21/57* (2013.01)
*G06F 21/76* (2013.01)
*G06F 21/74* (2013.01)
*G06F 9/445* (2018.01)

(52) U.S. Cl.
CPC ........ *G06F 21/572* (2013.01); *G06F 9/44505* (2013.01); *G06F 21/74* (2013.01); *G06F 21/76* (2013.01); *G06F 2221/034* (2013.01)

(58) Field of Classification Search
CPC ........ G06F 21/572; G06F 21/74; G06F 21/76; H04L 9/004

USPC .......................................................... 726/1
See application file for complete search history.

(56) References Cited

U.S. PATENT DOCUMENTS

| 7,555,787 B2 * | 6/2009 | Clercq ................ G06F 9/3017 726/34 |
| 9,047,474 B1 * | 6/2015 | Ahmad ................ G06F 21/575 |
| 10,303,878 B2 * | 5/2019 | Wu ......................... G06F 21/76 |

OTHER PUBLICATIONS

Boehm, Thomas, et al.; "AURIX Dedicated for Automated Driving and Electromobility", Embedded World, Nürnberg, Seiten 1-17, Mar. 2017.
Stumpf, F., et al.; "A Security Architecture for Multipurpose ECUs in Vehicles", In 25th Joint VDI/VW Automotive Security Conference, Ingolstadt, Germany, Oct. 2009, Seiten 1-20.—Firmenschrift. https://www.evita-project.org/Publications/SMWW09.pdf [abgerufen am Jun. 8, 2018], Oct. 2009.

(Continued)

*Primary Examiner* — Longbit Chai
(74) *Attorney, Agent, or Firm* — Eschweiler & Potashnik, LLC

(57) ABSTRACT

A method for processing data in a plurality of processing acts includes: configuring a plurality of processing circuits in a first configuration, in such a way that both a first and a second of the plurality of processing circuits execute a first of the plurality of processing acts; and configuring the plurality of processing circuits in a second configuration, in such a way that the first processing circuit executes a second processing act and the second processing circuit executes a third processing act, which is different than the second processing act. An apparatus is designed for carrying out the method.

18 Claims, 2 Drawing Sheets

(56) References Cited

OTHER PUBLICATIONS

"Automotive Safety Integrity Level," In: Wikipedia, Die freie Enzyklopädie. UTC. URL: https://en.wikipedia.org/w/index.php?title=Automotive_Safety_Integrity_Level&oldid=800558305 [abgerufen am Jun. 22, 2018], Sep. 14, 2017.

Infineon Technologies; "32-bit Microcontrollers for Automotive and Industrial Applications. TriCore for Safety Applications"; pp. 31-39; Jun. 8, 2018.

* cited by examiner

METHOD AND APPARATUS FOR PROCESSING DATA

REFERENCE TO RELATED APPLICATIONS

This application claims priority to German application number DE 10 2017 124 354.2 filed on Oct. 18, 2017 and is hereby incorporated in its entirety.

FIELD

The present disclosure relates to an apparatus and a method for processing data. The apparatus comprises a plurality of processing circuits. The method comprises configuring a plurality of processing circuits.

BACKGROUND

In order to obtain a high throughput with regard to processing data, a plurality of processing circuits can be used in parallel.

In order to carry out data processing as expediently as possible, processing circuits can be designed differently than one another in accordance with different tasks. By way of example, a plurality of different application specific integrated circuits (ASICs) each designed to handle a different task can be included on a circuit system of a module on a printed circuit board or on a chip.

SUMMARY

A simplified summary is set out below in order to afford a basic understanding of the disclosure in one or more regards. Said summary gives a rough overview of the disclosure, and it is intended neither to identify essential or critical features of the disclosure nor to derive the scope of the disclosure. Rather, the summary is intended primarily to present some concepts of the disclosure in a simple way in advance of the more thorough description that follows below.

In one regard, the disclosure relates to a method for processing data in a plurality of processing steps. The method comprises configuring a plurality of processing circuits in a first configuration, in such a way that both a first and a second of the plurality of processing circuits execute a first of the plurality of processing steps. The method furthermore comprises configuring the plurality of processing circuits in a second configuration, in such a way that the first processing circuit executes a second processing step and the second processing circuit executes a third processing step, which is different than the second processing step.

In one regard, the disclosure relates to an apparatus for processing data comprising a plurality of processing circuits which are configurable for operation in a plurality of configurations. In some embodiments, the apparatus is designed to be configurable at the run time. The apparatus comprises a configuration circuit designed optionally to configure the plurality of processing circuits in a first configuration in such a way that both a first and a second of the plurality of processing circuits execute a first processing step, and in a second configuration in such a way that the first processing circuit executes a second processing step and the second processing circuit executes a third processing step, which is different than the second processing step.

BRIEF DESCRIPTION OF THE DRAWINGS

The accompanying drawings are part of the present disclosure in order to enable a more profound understanding. The drawings illustrate embodiments and together with the description serve to clarify basic concepts of the disclosure.

DETAILED DESCRIPTION

Figure 1:
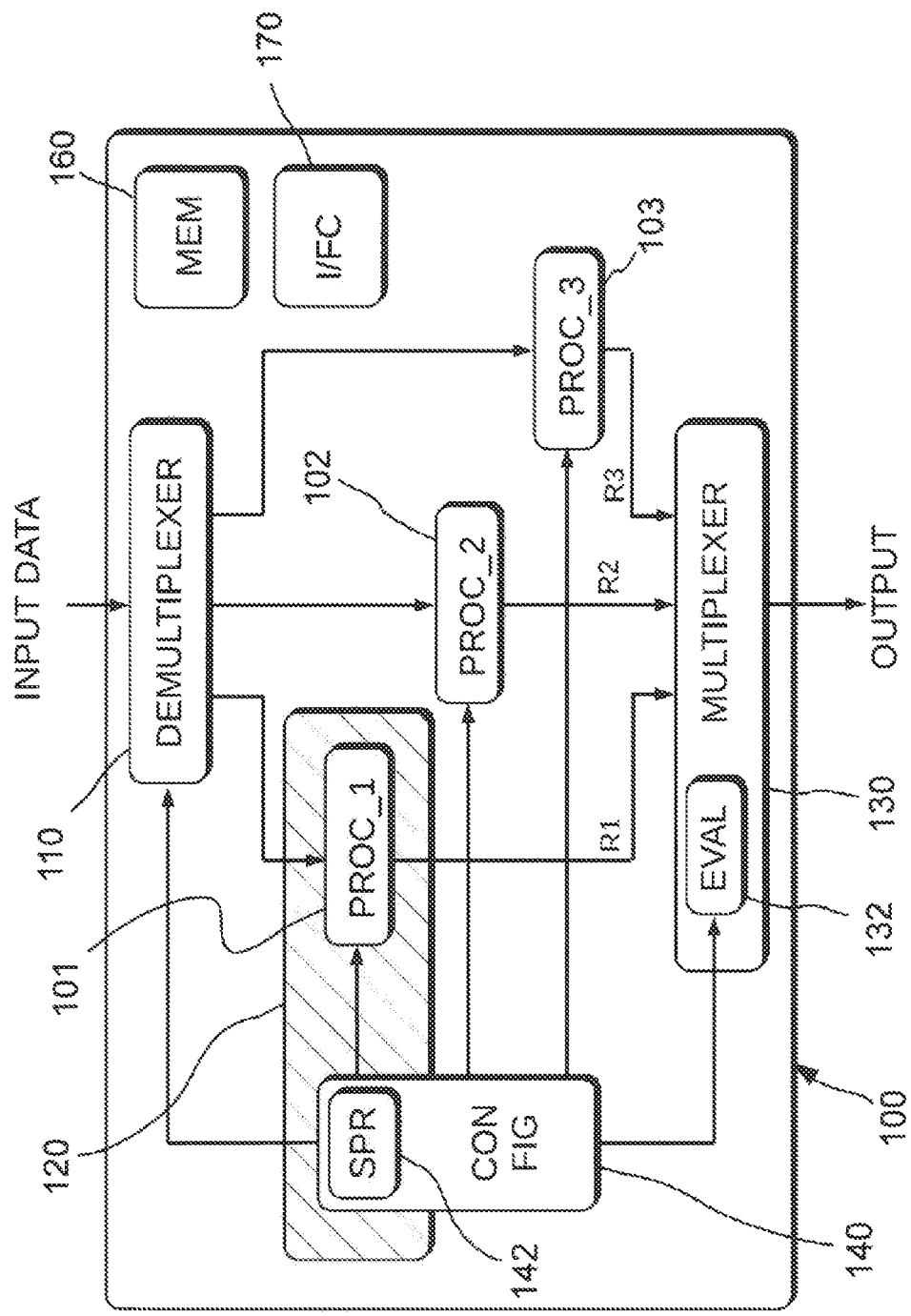
FIG. 1 is a block diagram that schematically illustrates a processor in accordance with some embodiments.

For elucidation purposes, quite a few specific details are explained in order to afford an extensive understanding of the claimed subject matter. It should be clear however, that the claimed subject matter can be implemented without these specific details.

The features of the drawings are not necessarily depicted in a manner true to scale with respect to one another. Similar reference signs designate similar parts corresponding to one another; the first digit denotes the number of the drawing in which the part identified is presented for the first time. Other embodiments and quite a lot of the intended advantages will be readily perceived if the thorough description below is used as an aid. It should be understood that other embodiments can be used and structural and/or logical changes can be made to the exemplary embodiments. Exemplary embodiments, embodiments and effects associated therewith are described below with reference to the accompanying drawings.

FIG. 1 is a block diagram that schematically illustrates a data processing apparatus (DP apparatus) in accordance with some embodiments. By way of example, the DP apparatus is designed as part of a microcontroller module, to which reference is made hereinafter as a microcontroller unit (MCU) 100. The microcontroller unit 100 can contain a plurality of components that are arranged for instance on a carrier such as a printed circuit board (PCB), for instance. In some embodiments, the plurality of components are integrated as a system in a chip (called system-on-chip).

In some embodiments, the microcontroller unit 100 comprises a plurality of processing circuits 101, 102, 103 which are configurable for operation in a plurality of configurations. In one embodiment, the microcontroller unit 100 is designed as an integrated circuit having a processor core (not shown). In some embodiments, the processing circuits 101, 102, 103 of the microcontroller unit 100 are designed as part of an arithmetic logic unit (ALU).

In another embodiment, the microcontroller unit 100 has a plurality of processor cores "PROC_1", "PROC_2" and "PROC_3", which each comprise one of the processing circuits 101, 102, 103, for example. In some embodiments, the processing circuits 101, 102, 103 are spatially at a distance from one another. By way of example, the processing circuits 101, 102, 103 are arranged in different chip housings at a distance from one another on the same printed circuit board or even in different modules, which, in the case of a use in a motor vehicle, for instance, are accommodated at locations spaced as far away from one another as possible. A possible limitation of the distance may arise here only from dimensions of the motor vehicle or on account of a limitation regarding still acceptable propagation time differences of signals that are communicated by different modules among one another. In some embodiments, the apparatus is designed in such a way that the processing circuits are supplied with voltage by different voltage sources. One effect may be that a processing step is executed by in each case two processing circuits 101, 102 as independently of one another as possible, such that a disturbance that affects the first processing circuit 101, for instance, does not simultaneously also affect the second processing circuit 102.

The microcontroller unit 100 furthermore comprises a security area 120, which is safeguarded against attacks and/or impediments as a result of environmental influences more strongly than some other area of the microcontroller unit 100. The security area can be shielded or safeguarded in some other way for example by means of particular precautions particularly against radiation. By way of example, in some embodiments, by means of an arrangement in a Faraday cage, the security area is protected against emission of electric and/or magnetic fields and/or protected from an influence of such fields from outside.

In some embodiments, the security area 120 is designed to be resistant to a differential current analysis and/or a run time analysis. In some embodiments, the security area is designed to be resistant to hardware faults caused by an attacker. By way of example, the security area 120 is designed to randomize current consumption in the secure area. At least one effect may be that a differential current analysis is made more difficult because an observed current consumption allows at best a statistically poorly provable conclusion to be drawn about a cryptographic operation executed. By way of example, the security area 120 is designed as a hardware security module (HSM) that forms a trust anchor within the microcontroller unit. The hardware security module can be protected by various hardware mechanisms and comprise specific hardware accelerators, for instance in order to perform hash functions and in order to perform symmetrical and asymmetrical cryptography functions. The hardware security module often also comprises an especially safeguarded key memory.

The microcontroller unit can comprise one or more buses (not illustrated). In some embodiments, the bus comprises a control bus designed to transmit control commands, control signals and/or control data from one component of the microcontroller unit 100 to another component of the microcontroller unit 100. In some embodiments, the bus comprises a databus. The databus is designed to transmit data from one component of the microcontroller unit 100 to another component of the microcontroller unit 100. In some embodiments, the bus is designed as a control and databus. The bus can comprise a parallel bus. The bus can be designed for the serial transmission of data.

The microcontroller unit 100 comprises a demultiplexer 110 designed to divide input data ("INPUT DATA") for processing in the plurality of processing steps among the plurality of processing circuits depending on a configuration.

The microcontroller unit 100 further comprises a multiplexer 130 designed to combine output data from the processing circuits 101, 102, 103. In this embodiment, the output data can be bundled to form an output data stream, for example, which can be transmitted for further processing for example on a bus (not illustrated) to some other device or can be output by the microcontroller unit 100. The multiplexer 130 is described even more thoroughly below.

Moreover, the apparatus comprises a configuration circuit 140 "CONFIG", which is designed to configure the plurality of processing circuits 101, 102, 103. Furthermore, the microcontroller unit 100 in some embodiments comprises special purpose registers 142. The special purpose registers 142 can for instance be contained in the configuration circuit 140 or be designed in a manner embedded as a part of the configuration circuit 140. In some embodiments, the special purpose registers 142 are arranged in a circuit section of the configuration circuit 140 that is present in the security area 120. In some embodiments, the configuration circuit 140 is designed to transmit control signals to the demultiplexer 110. In this embodiment, the demultiplexer 110 can divide the input data on the basis of the received control signals.

In some embodiments, the configuration circuit 140 is designed optionally to configure the plurality of processing circuits 101, 102, 103 in a first configuration and in a second configuration. In the first configuration, both a first 101 and a second 102 of the plurality of processing circuits 101, 102, 103 execute a first processing step. In the second configuration, the first processing circuit 101 executes a second processing step, and the second processing circuit 102 executes a third processing step, which is different than the second processing step. In some embodiments, the configuration circuit 140 is designed to assign the first configuration to a first security level and to assign the second configuration to a second security level. In this case, the first security level lies above the second security level.

In some embodiments, the configuration circuit 140 is designed to carry out the configuring before the process of executing the plurality of processing steps. However, the configuration circuit 140 can also be designed to carry out the configuring dynamically. In some embodiments, the configuration circuit 140 is designed for example to carry out the configuring during the execution of a processing step. In some embodiments, the configuration circuit 140 is designed to carry out the configuring between the execution of two mutually different processing steps.

In some embodiments, registers 142 for special tasks of the configuration circuit 140 which are designed to store configuration data of the plurality of configurations, are arranged in the security area 120. In particular, the security area 120 can comprise all registers 142 for special tasks of the configuration circuit 140 which are designed to store configuration data of the plurality of configurations.

The apparatus furthermore comprises at least one evaluation device 132 "EVAL", which is generally designed to combine data received by the evaluation device 132 from the processing circuits 101, 102, 103 for instance by way of an evaluation. In some embodiments, the evaluation device 132, as shown in FIG. 1, is designed as a part of the multiplexer 130. In the example shown in FIG. 1, the evaluation device 132 is designed, for instance, to control the multiplexer 130 in such a way that the multiplexer 130 outputs a combination result "OUTPUT" representing a result of the combination or a result of the evaluation and thus processing results of the processing circuits 101, 102, 103. By way of example, in some embodiments, the evaluation device 132 is configured to output a decision signal representing a majority decision on the basis of weighted processing results from the plurality of processing circuits 101, 102, 103. The combination result can comprise the decision signal. In other embodiments, the evaluation device can also be designed separately from the multiplexer 130. By way of example, in some embodiments, further processing circuits are provided (not illustrated), which are configurable for instance in pairs, in triples or in otherwise multiple redundant fashion. In this example, the evaluation device can be of divided or distributed design, wherein each part is respectively assigned to a pair, a triple or some other plurality of processing circuits regarding which the part of the evaluation device is designed for evaluating processing results.

In some implementations, the multiplexer 130 or the evaluation circuit 132 is designed to indicate a trustworthiness of the combination result, for instance as a flag that is set if redundant processing is carried out as in the above-described case of the execution of the first processing section 101 by at least both the first processing circuit 101 and the second processing circuit 102. In one embodiment, at least one fixed bit is reserved for the flag in the digital representation of processing results. In one embodiment, the flag represents the decision signal.

In some embodiments, the evaluation device 132 comprises a comparison device designed to compare a first processing result from the first processing circuit 101 with a second processing result from the second processing circuit 102. The comparison device is designed to signal an error if the second processing result differs from the first processing result.

Processing results of the processing circuits 101, 102, 103 can be weighted identically. In some embodiments, the processing results are weighted differently. By way of example, the processing result of the first processing circuit 101, which is arranged in the security area 120, can be rated with a magnitude double that of the processing result of the second processing circuit 102 or the third processing circuit 103. It should be understood that the person skilled in the art will consider a weighting that is expedient according to the circumstances of the individual case. The signal can be designed as an error message, according to which the processing results of the plurality of data processing circuits 101, 102, 103 deviate from one another to an extent greater than permissible within an error tolerance.

In some embodiments, the microcontroller unit 100 furthermore comprises a memory 160. The memory 160 can be coupled to the plurality of processing circuits 101, 102, 103, for example by means of the bus (not shown), in such a way that the plurality of processing circuits 101, 102, 103 can write data to the memory 160 and/or read data from the memory 160. In some embodiments, the microcontroller unit 100 and the memory 160 are integrated in a circuit. The memory 160 is designed for example as an embedded memory. In one exemplary embodiment that means that memory cells of the memory 160 are part of the same integrated circuit of the processor core which also comprises the plurality of processing circuits 101, 102, 103. By way of example, the memory 160 is designed as a spatially separate block of the integrated circuit with the microcontroller unit 100, which is connected to the memory 160 by lines. In another embodiment, the memory is coupled to the microcontroller unit 100, but without being part of the microcontroller unit 100. By way of example, the memory 160 is designed as a spatially separate block of the integrated circuit with the processing circuits 101, 102, 103, which are connected to the memory 160 by lines, for instance of the bus (not shown). In some embodiments, the memory 160 is of nonvolatile design. In particular, in one embodiment the memory 160 comprises nonvolatile memory cells.

It should be understood that the microcontroller unit 100 can contain other components, the description of which is omitted here in order to facilitate the understanding of the concept underlying exemplary embodiments. In this regard, the apparatus in some embodiments comprises a coupling device 170 designed to receive program code from a storage medium. In some embodiments, the coupling device is designed as a bus connection. By way of example, the coupling device 170 can be an interface ("I/FC") to a static random access memory (SRAM memory) or to a flash memory. In some embodiments, the coupling device 170 is designed as an Ethernet interface. In another embodiment, the coupling device 170 is designed as a bus connection designed for operation in accordance with the Universal Serial Bus (USB) standard. By way of example, a memory can be coupled to the processor by means of the coupling device 170. By way of example, the microcontroller unit 100 can be designed for coupling, by means of the coupling device, to a storage medium (not illustrated) that stores program code which, when executed on the microcontroller unit 100, causes the microcontroller unit 100 to execute processing acts of a method in accordance with the concepts disclosed here. One example of such a method and variants of the method are described in greater detail below with reference to FIG. 1 and FIG. 2.

Figure 2:
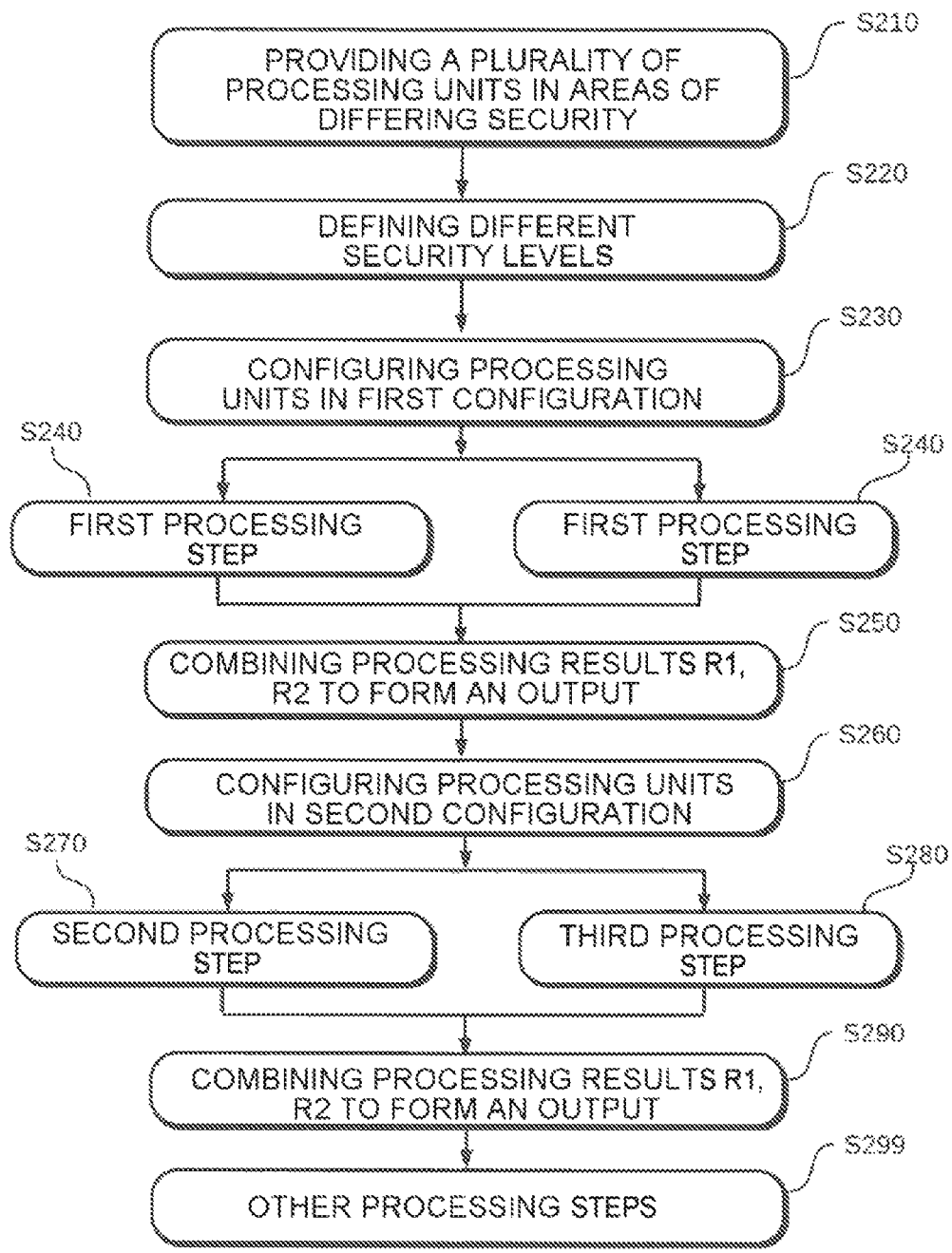
FIG. 2 shows a flow diagram that schematically illustrates a method in accordance with some embodiments.

FIG. 2 shows a flow diagram that schematically illustrates a method for processing data in a plurality of processing acts in accordance with some embodiments.

The method comprises safeguarding at least the first processing circuit 101 against attacks by third parties and/or impediments as a result of environmental influences. Generally, at S210, the plurality of processing circuits 101, 102, 103 are provided in areas of differing security. In some embodiments, for instance, the security area 120 in the microcontroller unit 100 is designed to be resistant to a differential current analysis. By way of example, the security area 120 is designed to randomize current consumption in the secure area. Consequently, at least with regard to that circuit section which is arranged in the security area 120, the first processing circuit 101 is more secure than the second processing circuit 102 and the third processing circuit 103.

Some embodiments of the method comprise, at S220, defining at least a first security level (A) and a second security level (B), wherein the first security level (A) lies above the second security level (B). The method further comprises assigning a first configuration "C11" to the first security level (A) and assigning a second configuration "C23" to the second security level (B). In accordance with the first configuration C11, both the first processing circuit 101 and the second processing circuit 102 of the plurality of processing circuits 101, 102, 103 execute a first of the plurality of processing acts. In accordance with the second configuration C23, by contrast, the first processing circuit 101 executes a second processing act and the second processing circuit 102 executes a third processing act, which is different than the second processing act. Corresponding data can be stored securely. By way of example, the configuration circuit 140 can store assignment data representing the assignments of configuration to security level and/or configuration data representing the first configuration C11 and/or the second configuration C23 in those registers 142 for special tasks of the configuration circuit 140 which are arranged in the circuit section of the configuration circuit 140 that is formed in the security area 120 of the microcontroller unit 100. The configuration circuit 140 communicates information data regarding the chosen first configuration C11 or the possibly chosen second configuration C23 at least to affected components of the microcontroller unit 100, i.e.—in the present example—to the first processing circuit 101 and to the second processing circuit 102 and also to the multiplexer 130, to put it more precisely to the evaluation device 132 of the multiplexer 130.

At S240, the demultiplexer 110 allocates data to be processed to the first processing circuit 101 and the second processing circuit 102. In one embodiment, the data allocated to the first processing circuit 101 in accordance with the first configuration C11 and the data allocated to the second processing circuit 102 are identical. The processing circuits 101, 102 execute the first processing act in each case in accordance with the first configuration C11 and thus process the allocated data to form a first processing result R1 and a second processing result R2.

In some embodiments, the method comprises combining a first processing result from the first processing circuit 101 with a second processing result from the second processing circuit 102. Accordingly, the exemplary method comprises, at S250, that the multiplexer 130 receives and combines the processing results R1, R2. By way of example, the evaluation device 132 can compare the first processing result R1 and the second processing result R2 with one another in order to ascertain a correspondence or a deviation of the two results R1, R2 in relation to one another. Accordingly, the method can comprise signaling an error if the second processing result R2 differs from the first processing result R1.

In some embodiments, the first processing result R1 can be weighted more highly than the second processing result R2. In particular, the evaluation device 132 can correlate a weighting of a processing result upon the combination of processing results R1, R2, R3 of the plurality of processing circuits 101, 102, 103 by the multiplexer 130 positively with a security level which is assigned to a processing of data by the respective processing circuit 101, 102 and 103. By way of example, with regard to the processing of data by the first processing circuit 101, the security level can be high, for which reason the first processing result R1 from the first processing circuit 101 is weighted more highly than, for instance, the second processing result R2 from the second processing circuit 102 or a third processing result R3 from the third processing circuit 103.

In some embodiments, as described above, the configuring is carried out before the process of executing the plurality of processing acts. In particular, the configuring can be carried out before the execution of the first process act. However, the method comprises configuring the plurality of processing circuits 101, 102, 103 not only in the first configuration C11 but also in the second configuration C23. Accordingly, the configuring can generally be carried out between the execution of two mutually different processing acts. By way of example, after the execution of the first processing act, for instance, in S260, the configuration circuit 140 configures the processing circuits 101, 102 once again in order to adapt the processing circuits 101, 102 with regard to the further processing of data to security requirements which may turn out to be less stringent for the second processing act and the third processing act, for example, than for the first processing act. In such a case, the first configuration C11 can provide, as described above, for the configuration circuit 140 to configure the first processing circuit 101 and the second processing circuit 102 firstly in the first configuration C11, in which they execute the same first processing act, and then in the second configuration C23, in which they execute the second processing act and the third processing act, which are mutually different.

At least one effect of the method described by way of example above may be that the microcontroller unit 100 can be adapted depending on the requirements of the individual case, in particular with regard to the security level, in order thus to operate as securely as necessary and at the same time to achieve as high a processing speed as possible. In this case, depending on the embodiment, the term security can be understood both in the sense of fail-safety or reliability and in the sense of security against attacks or trustworthiness. This is because an attacker will have greater difficulty in attacking a plurality of areas without being noticed, for instance in order to induce the same error in two areas. At the same time, redundancy with regard to processing also increases security against other disruptions that may lead to errors.

If an error is ascertained or a lack of reliability of a processing process with the different processing acts is discernable, the processing process can be terminated at an early stage and resources provided for carrying out the processing process can be released. In the example described above, after the execution of the first processing act, for instance, an impediment of the reliability of the processing act could be ascertained if the first processing result does not correspond to the second processing result. In this case, the microcontroller unit 100 can terminate the processing, such that the second processing act 102 and the third processing act 103 are no longer executed at all, and the microcontroller unit 101 can transition for example to the execution of other processing acts.

While the flow diagram shown in FIG. 2 only shows a case whose implementation does not necessitate the third processing circuit 103, in one variant of the method, by way of example, the third processing circuit 103 can also participate in carrying out the method. Accordingly, by way of example, one variant (not illustrated) of the method described above generally on the basis of the example with two processing circuits 101, 102 comprises providing at least the third processing circuit 103. In one embodiment, the method comprises assigning at least a third configuration "C111" to a third security level. By way of example, the third security level is defined in such a way that the third security level lies both above the first security level and above the second security level. In this case, the third configuration C111 comprises the third processing circuit 103 likewise executing the first processing act. At least one effect may be that, upon the evaluation of the processing results from the processing circuits 101, 102, 103, a combination of the processing results of the three processing circuits 101, 102, 103 which have executed the same processing act, in particular taking account of a third processing result R3 from the third processing circuit 103, in the case of a correspondence of the three processing results, yields a higher measure of trustworthiness of the corresponding result than in the simpler case described above, in which only the first processing result R1 of the first processing circuit 101 and the second processing result R2 of the second processing circuit 102 are combined.

In one variant of the method described above, a fourth security level is defined in such a way that the fourth security level lies between the first security level and the second security level. In this case, the method comprises assigning at least a fourth configuration "C234" of the three processing circuits 101, 102, 103 to the fourth security level. The configuration can stipulate, for instance, that the first processing circuit 101 executes the second processing act and both the second processing circuit 102 and the third processing circuit 103 execute the third processing act.

In a further embodiment, the method comprises assigning a fourth configuration to the second security level. In this case, in accordance with the fourth configuration, the third processing circuit 103 executes a fourth processing act, which is different than the first processing act, the second processing act and the third processing act. At least one effect may be that, on account of the cancelation of redundancy with regard to the processing acts executed by the processing circuits 101, 102, 103, a processing speed is maximized because each of the processing circuits 101, 102, 103 executes a different processing act.

Other combinations of components and sequence acts are possible in the context of the teaching described by way of example in the present case. Further processing circuits can be provided, for example, which, depending on configuration, can ensure an additional redundancy and thus processing security both vis-à-vis natural disruptions and vis-à-vis errors deliberately introduced on the part of attackers, a high parallelism in the execution of different processing acts, such that a particular high throughput is possible during the processing of data by means of the microcontroller unit, or particular security against attacks is ensured if the further processing circuits are arranged wholly or partly in a secure area of the microcontroller unit.

Although the exemplary embodiments have been described herein using a microcontroller unit, generally it is possible to use any apparatus which is designed to implement an embodiment of the method described above. The processing circuits can be implemented as circuit blocks which are spatially separated from one another. In one embodiment, the processing circuits are designed as mutually temporally offset phases of the data processing by one and the same processor. Thus, with regard to the first configuration, a delay circuit can be provided, for instance, in order that data which have already been passed directly from a node to the processor and been processed by the processor are passed to the same processor a second time via the delay line in order that the processor processes the data a second time.

The processing circuits and/or other components in accordance with the techniques described above can also be implemented in software for instance as virtual machines, virtual processors or as threads. Different security areas can be implemented virtually if, with regard to the processing of data for instance by a first virtual machine, special measures such as, for instance, encryption, establishing noise in the processing acts or such like security measures are implemented individually or in combination. Hybrid implementations are likewise possible. By way of example, a processing circuit can be formed in an area of a circuit that is especially safeguarded physically against disturbances and/or attacks, while other processing circuits are implemented as virtual machines, for instance, which are executed on a processor circuit outside the especially safeguarded area.

One exemplary application of the techniques described herein may be in the field of communication of data within motor vehicles. The communication is susceptible since, during the operation of the motor vehicle, disturbances originate from the environment and from electrical installations of the motor vehicle itself. In one embodiment, the techniques described above are used to authenticate messages more reliably on the basis of so-called Message Authentication Codes (MAC). By a procedure in which a processing act "authentication of the MAC" is carried out by a plurality of processing circuits, it is possible to achieve a higher reliability of the combination result determined by an evaluation of the processing results. By way of example, if three processing circuits are used redundantly, a majority decision can be taken in order to determine the authentication code that is highly likely to be applicable. A likelihood of mistakenly authenticating a message that should be rejected as non-authenticated is accordingly reduced. Equally, by way of example, an integrity check for instance during the boot process, firewalls, a system for exposing intruders and security protocols are also suitable as applications.

One particular effect of the methods described herein or of the apparatus provided for carrying out the methods may reside in a reduction of a risk of manipulation of data. This is because the redundancy of processing acts to be executed hampers an unauthorized decryption of encrypted data.

In so far as used herein, the word "exemplary" and the words "by way of example" and the formulation "for example" mean that an example is given or an embodiment is presented. An aspect mentioned by way of example should not necessarily be interpreted as advantageous or preferable. Rather, the example serves to elucidate a concept or a technique on the basis of a concrete possible implementation. The term "technique" here encompasses any product of planned action using forces of nature, depending on the context in particular "appliance", "apparatus", "device", "system", "production product", "computer-readable medium", "computer program product" and "method".

In so far as used herein, enumerating terms such as 'first', 'second' and the like are used to designate different elements, areas or steps. The enumerating terms, in particular with regard to the number, should not be interpreted in a restrictive manner.

In so far as used herein, the terms "determining" and "calculating" and variants thereof are used interchangeably to denote any method for arriving at a result on the basis of initial data by the evaluation thereof.

The invention claimed is:

1. A method for processing data in a plurality of processing acts, the method comprising:
configuring a plurality of processing circuits in a first configuration, in such a way that both a first processing circuit and a second processing circuit of the plurality of processing circuits execute a first processing act of the plurality of processing acts; and
configuring the plurality of processing circuits in a second configuration, in such a way that the first processing circuit executes a second processing act and the second processing circuit executes a third processing act, which is different than the second processing act,
configuring a multiplexer circuit to combine output data from the first processing circuit and the second processing circuit after the first processing act, and again combine output data from the first processing circuit and the second processing circuit after the second processing act and after the third processing act, respectively.

2. The method as claimed in claim 1, further comprising:
assigning the first configuration to a first security level; and
assigning the second configuration to a second security level,
wherein the first security level is greater than the second security level.

3. The method as claimed in claim 2, further comprising:
the plurality of processing circuits further comprises a third processing circuit;
configuring the plurality of processing circuits in a third configuration; and
assigning the third configuration to a third security level,
wherein in accordance with the third configuration the first processing act if the third security level lies above the first security level and the second security level.

4. The method as claimed in claim 3, further comprising:
assigning a fourth configuration to a fourth security level,
wherein in accordance with the fourth configuration the third processing circuit likewise executes the second processing act or the third processing act if the fourth security level lies between the first security level and the second security level.

5. The method as claimed in claim 3,
assigning a fifth configuration to the second security level, wherein the third processing circuit in accordance with the fifth configuration executes a fourth processing act, which is different than the first processing act, the second processing act and the third processing act.

6. The method as claimed claim 1, further comprising:
comparing a first processing result of the first processing act from the first processing circuit with a second processing result of the first processing act from the second processing circuit; and
signaling an error if the second processing result differs from the first processing result.

7. The method as claimed in claim 1,
wherein the first configuration is carried out before the process of executing the first processing acts, and the second configuration is carried out between the execution of the second processing act and the third processing act.

8. The method of claim 1, wherein the multiplexer circuit is configured to output a signal representing a majority decision on a basis of weighted processing results from the plurality of processing circuits, wherein each processing result from the plurality of processing circuits is weighted with a magnitude, and the majority decision comprises selecting the processing result with the greatest magnitude.

9. A non-transitory computer-readable storage medium, wherein the non-transitory computer-readable storage medium stores program code which, upon execution on a data processing circuit, causes the data processing circuit to execute processing acts, comprising:
configuring a plurality of processing circuits in a first configuration, in such a way that both a first processing circuit and a second processing circuit of the plurality of processing circuits execute a first processing act of the plurality of processing acts, wherein the first processing act produces a first result, and a combination of the first result from the first processing circuit and the first result from the second processing circuit constitutes a first processing result;
configuring the plurality of processing circuits in a second configuration, in such a way that the first processing circuit executes a second processing act and the second processing circuit executes a third processing act, which is different than the second processing act, wherein the second processing act produces a second result, the third processing act produces a third result, and a combination of the second result and the third result constitutes a second processing result; and
configuring a signaling circuit to evaluate the first processing result and the second processing result, and to select the processing result with a greatest security level.

10. An apparatus for processing data, comprising:
a plurality of processing circuits which are configurable for operation in a plurality of different configurations;
a configuration circuit configured to selectively configure the plurality of processing circuits in a first configuration in such a way that both a first processing circuit and a second processing circuit of the plurality of processing circuits execute a first processing act, and configure the plurality of processing circuits in a second, different configuration in such a way that the first processing circuit executes a second processing act and the second processing circuit executes a third processing act, which is different than the second processing act; and
a signaling circuit configured to output a signal representing a majority decision on a basis of weighted processing results from the plurality of processing circuits, wherein each weighted processing result from the plurality of processing circuits is weighted with a magnitude, and the majority decision comprises selecting the weighted processing result with the greatest magnitude.

11. The apparatus as claimed in claim 10, wherein the configuration circuit is configured to assign the first configuration to a first security level and to assign the second configuration to a second security level, wherein the first security level is greater than the second security level.

12. The apparatus as claimed in claim 11, wherein the configuration circuit is configured to carry out the configuring before the process of executing the plurality of processing steps and/or dynamically during the execution of a processing step or between the execution of two mutually different processing steps.

13. The apparatus as claimed in claim 10, wherein the signaling circuit comprises a comparison circuit configured to compare a first processing result from the first processing circuit with a second processing result from the second processing circuit and to detect and to signal if the second processing result differs from the first processing result.

14. The apparatus as claimed in claim 10, further comprising:
a security area configured to be safeguarded against attacks by third parties and/or impediments as a result of environmental influences more strongly than some other area of the apparatus, wherein at least the first processing circuit is arranged in the security area.

15. The apparatus as claimed in claim 14, wherein the security area comprises registers of the configuration circuit which are configured to store configuration data of the plurality of configurations.

16. The apparatus as claimed in claim 10, wherein the apparatus is configured, via the configuration circuit, to:
configure a plurality of processing circuits in a first configuration, in such a way that both a first processing circuit and a second processing circuit of the plurality of processing circuits execute a first processing act of the plurality of processing acts; and
configure the plurality of processing circuits in a second configuration, in such a way that the first processing circuit executes a second processing act and the second processing circuit executes a third processing act, which is different than the second processing act.

17. The apparatus as claimed in claim 16, further comprising:
a coupling circuit configured to receive program code from a storage medium which, upon execution on a data processing circuit, causes the data processing circuit to execute processing acts in order to execute a plurality of processing acts.

18. The apparatus as claimed in claim 10, further comprising:
a demultiplexer circuit configured to divide input data for processing in the plurality of processing acts among the plurality of processing circuits depending on the configuration, and/or
a multiplexer circuit configured to combine output data from the processing circuits.

* * * * *